United States Patent [19]
Cadorniga et al.

[11] Patent Number: 5,538,794
[45] Date of Patent: * Jul. 23, 1996

[54] GOLF BALL COVER

[75] Inventors: Lauro C. Cadorniga, Piedmont; Frank M. Simonutti, Anderson, both of S.C.

[73] Assignee: Dunlop Slazenger Corporation, Greenville, S.C.

[*] Notice: The term of this patent shall not extend beyond the expiration date of Pat. No. 5,415,937.

[21] Appl. No.: 439,455

[22] Filed: May 11, 1995

Related U.S. Application Data

[63] Continuation of Ser. No. 140,613, Oct. 21, 1993, Pat. No. 5,415,937.
[51] Int. Cl.$^6$ ............ C08L 33/02; A63B 37/12
[52] U.S. Cl. ............ 428/407; 524/908; 525/196; 525/221; 525/330.1; 525/330.2; 525/366; 525/919; 473/378
[58] Field of Search ............ 273/235 R; 428/407; 524/908; 525/196, 221, 330.1, 330.2, 366, 919

[56] References Cited

U.S. PATENT DOCUMENTS

| | | | |
|---|---|---|---|
| 3,384,612 | 5/1968 | Brandt et al. | 260/41 |
| 4,165,347 | 8/1979 | Bauer et al. | 525/69 |
| 4,321,337 | 3/1982 | Smith | 525/329 |
| 4,323,247 | 4/1982 | Keches et al. | 273/235 R |
| 4,346,196 | 8/1982 | Hoh et al. | 525/196 |
| 4,469,754 | 9/1984 | Hoh et al. | 428/476.3 |
| 4,526,375 | 7/1985 | Nakade | 273/235 R |
| 4,679,795 | 7/1987 | Melvin et al. | 273/235 R |
| 4,690,981 | 9/1987 | Statz | 525/329.6 |
| 4,884,814 | 12/1989 | Sullivan | 273/235 R |
| 4,911,451 | 3/1990 | Sullivan et al. | 273/235 R |
| 4,984,804 | 1/1991 | Yamada et al. | 273/235 R |
| 4,990,574 | 2/1991 | Yamada | 525/371 |
| 5,000,459 | 3/1991 | Isaac | 273/235 R |
| 5,068,151 | 11/1991 | Nakamura | 428/407 |
| 5,120,791 | 6/1992 | Sullivan | 525/196 |
| 5,197,740 | 3/1993 | Pocklington et al. | 273/235 R |
| 5,298,571 | 3/1994 | Statz et al. | 525/330.2 |
| 5,314,187 | 5/1994 | Proudfit | 273/235 R |
| 5,321,089 | 6/1994 | Cadorniga et al. | 525/196 |
| 5,328,959 | 7/1994 | Sullivan | 525/196 |
| 5,368,304 | 11/1994 | Sullivan et al. | 273/220 |

Primary Examiner—Patrick J. Ryan
Assistant Examiner—Marie R. Yamnitzky
Attorney, Agent, or Firm—Lorusso & Loud

[57] ABSTRACT

An improved golf ball including a novel cover composition, including a blend of a high stiffness ionomer having a melt index of 0.5–5.0 g/min., flexural modulus of 60,000–120,000 psi and shore hardness of 70 or greater and a very low modulus methacrylic acid ionomer having a melt index of 0.5 to 10.0 g/min., flexural modulus of 2,000–8,000 psi or less and Shore D hardness of 20–50. The resulting golf ball shows improved resilience and playability over known golf balls.

7 Claims, 4 Drawing Sheets

GOLF BALL COVER

This is a continuation of application Ser. No. 08/140,613 filed on Oct. 21, 1993, now U.S. Pat. No. 5,415,937.

BACKGROUND OF THE INVENTION

This invention relates in general to golf balls and, more particularly, to a golf ball having a cover material exhibiting improved playability characteristics and resilience and performance properties.

The assembly of a golf ball generally involves molding a cover around a solid or wound core. Golf balls with wound cores are typically referred to as "three piece" balls because they consist of three basic components: (1) a solid or liquid-filled center; (2) rubber winding around the center, and (3) the cover. Similarly, solid cores are referred to as having a "two piece" construction, since they consist solely of a solid core and a cover. A third type of ball, known as a "one-piece" ball is also known in the art. As the name suggests, one piece balls are solid balls of homogeneous construction made by any conventional molding method suitable for the purpose.

The composition of the golf ball cover has proven to be a factor in overall golf ball performance. Historically, three piece and two piece golf balls had covers made of Balata, a natural resin obtained from trees in South and Central America and is essentially made up of transpolyisoprene. Balata is readily adaptable to molding processes to produce a high quality golf ball.

Balata is still used today as a cover material because of the "click" and "feel" provided by the balata cover to the golfer. "Click" is the sound made by a golf club head when it hits the ball. "Feel" is the overall sensation transmitted to the golfer after hitting the ball. Balata covered golf balls are also used because of the excellent playability and good flight performance qualities. These balls give good flight distance and skilled golfers can impart desirable spin to the ball, enabling it to draw or fade in flight. Also, especially with high-lofted clubs, the backspin allows the ball to stop abruptly on approach shots.

However, balata type materials are expensive and the manufacturing procedures required are time-consuming, labor-intensive and therefore expensive.

The majority of modern golf balls use a two piece construction with covers made of a durable synthetic thermoplastic resin such as Surlyn, a product of E. I. DuPont de Nemours Company, Incorporated. Synthetic thermoplastic cover materials have been used with limited success. They are durable and produce satisfactory flight distance. Additionally, they are less costly to manufacture than balata covers. However, these materials are hard and therefore lack the "click" and "feel" of a balata ball. Moreover, it is not possible to impart to such balls the desirable spin characteristics required by skilled golfers. It is desirable, however, to utilize a synthetic cover material for improved process manufacturing and to increase durability and resilience performance.

In an attempt to overcome the negative factors of the hard ionomer covers, low modulus SURLYN ionomer-covered golf balls were introduced in the early 1980's. These SURLYN ionomers have a flexural modulus of from 25 to about 40 as measured on she Shore D scale-ASTM 2240. E. I. DuPont De Nemours & Company has disclosed that the low modulus ionomers can be blended with other grades of previously commercialized ionomers of high flexural modulus of from about 30,000 to 55,000 psi to produce balata-like properties in a golf ball covered with this material. The qualities found in these golf balls, especially as to durability, were not optimal.

U.S. Pat. No. 4,884,814 to Sullivan teaches blending a hard ionomer resin with a soft ionomer resin to produce a cover having enhanced playability characteristics and a good durability for continuous play. In that reference, a golf ball cover blend includes a hard Surlyn ionomer resin, having a hardness of 60-66 on the Shore D scale as measured in accordance with ASTM method D-2240, and various soft Surlyn ionomer resins having hardness ranging from 25-40 on the Shore D scale. Specifically, the patent claims 25-70% of the hard ionomer which is a sodium or zinc salt of the specified copolymer and having flexural modulus of 30,000 –50,000 psi, blended with 75-25% of the soft ionomer which is a sodium or zinc salt of a specified terpolymer and having a flexural modulus of 3000–7000 psi.

U.S. Pat. No. 5,120,791, also to Sullivan, is designated an improvement to the earlier patent and reveals a composition said to have enhanced carrying distance. The blends of this second Sullivan patent include 90–10% of an acrylic acid based hard ionomer neutralized with sodium or zinc and having a Shore D hardness greater than 50 and a flexural modulus up to 70,000 psi, with an acrylic acid based soft ionomer having a Shore D hardness of 20–40 and a flexural modulus of 2000 to 8000 psi.

Covers produced according to these references have improved playability over traditional Surlyn covers but at a cost of losing resilience and distance properties.

Accordingly, it is an object of the present invention to provide a golf ball having a synthetic cover material.

Another object of the present invention is to provide an improved synthetic cover material for a golf ball.

It is another object of the present invention to provide a golf ball having a synthetic cover material that achieves the click, feel, playability and flight performance qualities of Balata covered golf balls.

A further object of the present invention is to provide a golf ball having a cover material that has improved process manufacturing as well as durability and resilience.

SUMMARY OF THE INVENTION

The cover material of the present invention is a blend of a high stiffness ionomer with a very low modulus ionomer. The resulting cover when used on a golf ball improves the feel and playability of the ball as against a standard ionomer cover. In addition, the balls retain resilience and distance performance over prior art balls.

These and other objects and features of the present invention will be apparent from a reading of the following detailed description of the invention, taken with the drawing.

DETAILED DESCRIPTION OF THE INVENTION

Figure 1:
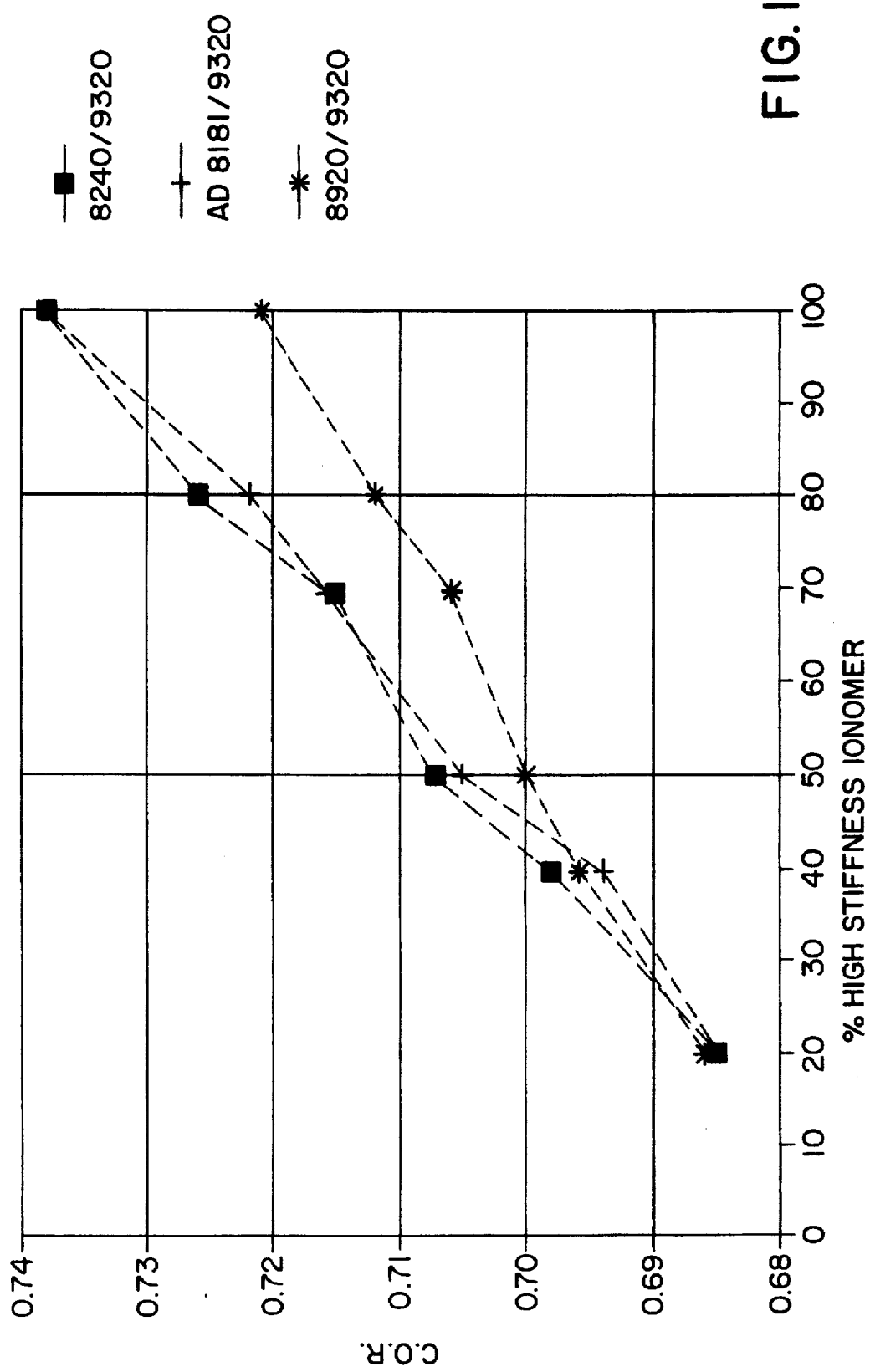
FIG. 1 illustrates the C.O.R. versus the high stiffness ionomer content for golf balls having covers of different blends, including the cover blends of the present invention.

The cover material of the present invention, and golf balls covered with this material, are produced by blending a highstiffness ionomer and a very low modulus ionomer. Golf balls made with the covers produced from the compositions of the present invention show marked improvement in resilience, measured by the coefficient of restitution "C.O.R.", and in initial velocity tests, over prior art golf balls.

C.O.R. is the ratio of the relative velocity of two elastic spheres after direct impact to that before impact. C.O.R. can vary from zero to one, with one being equivalent to an elastic collision and zero being equivalent to an inelastic collision. C.O.R. is one of the principle factors in determining the distance a ball will travel when hit.

Initial velocity is also improved in golf balls utilizing the cover composition of the present invention. Initial velocity is the velocity of a golf ball when struck at a speed specified by the United States Golf Association.

As used herein, the term "high-stiffness ionomer" is defined as a copolymer including 75–80% of an olefin, most commonly ethylene, and 20–25% of an alpha, beta ethylenically unsaturated caboxylic acid, such as acrylic or methacrylic acid, having 10–90% of the carboxylic acid groups neutralized with sodium, lithium, zinc or magnesium ions. For example, various types of SURLYN, available from E.I. DuPont de Nemours & Company, Incorporated of Wilmington, Del. are acceptable for use in the present invention as the high stiffness ionomer resin.

Additionally, the high stiffness ionomer will preferably have a melt index of 0.5–5.0 g/10 min., Shore D hardness of 70 or greater, and a flexural modulus of 60,000–120,000 psi.

Certain high stiffness ionomers useful in the present invention have the following physical properties:

| Material | Ion Type | % Acid | Flexural Modulus | Shore "D" |
|---|---|---|---|---|
| Surlyn 8240 | Na | 20 | 75,000 | 75 |
| Surlyn 8220 | Na | 20 | 79,000 | 75 |
| Surlyn AD 8181 | Li | 20 | 97,000 | 73 |

Flexural modulus testing performed according to ASTM D-790 test procedure.
Shore "D" hardness values obtained according to ASTM D-2240 procedure.

As used herein, the term very low modulus ionomer (VLMI) shall be defined as a terpolymer, consisting of 67–70% by weight of ethylene, 20–23% by weight of n- or iso-butyl acrylate, and 10% by weight of methacrylic acid, where 10–90% of the acid groups are neutralized by sodium, zinc or lithium ions. The VLMI will preferably have a melt index of 0.5–10 g/10 min., Shore D hardness of 20–50, and a flexural modulus of between 2,000–8,000 psi.

Suitable for use in the present invention are the following ionomers having the indicated physical properties:

| Material | Ion Type | % Acid | Flexural Modulus | Shore "D" |
|---|---|---|---|---|
| Surlyn 9320 | Zn | 10 | 3,700 | 40 |
| Surlyn 8320 | Na | 10 | 2,800 | 25 |
| Surlyn 8120 | Na | 10 | 7,100 | 39 |

Flexural modulus testing performed according to ASTM D-790 test procedures.
Shore "D" hardness values obtained according to ASTM D-2240 procedure. These ionomers are also available from E.I. DuPont de Nemours, Incorporated of Wilmington, Delaware.

In its preferred embodiment, the cover material of the present invention will include 80–50% by weight of a highstiffness ionomer, consisting of 80–75% by weight of ethylene, and 20–25% by weight of carboxylic acid, 10–90% of which are neutralized with one of the metal ions Na, Zn, Li, or Mg and having a melt index of 0.5–5.0 g/10 min., flexural modulus of 60,000–120,000 psi and Shore "D" 70 or greater, and 20–50% by weight of a very low modulus ionomer (VLMI) consisting of 67–70% by weight ethylene, 20–23% by weight of n- or iso-butyl acrylate, and 10% by weight of methacrylic acid, 10–90% of which are neutralized with one of the metal ions Na, Zn, Li, and having a melt index of 0.5–10.0 g/10 min, flexural modulus of 2,000–8,000 psi or less, and Shore "D" hardness of 20–50.

Additional materials may be added to the compositions of the present invention, including dyes or colorants, such as titanium dioxide, ultramarine blue, ultramarine violet and an ionomeric carrier. A suitable colorant is available from AMERICHEM Inc. of Cuyahuga, Ohio. A colorant will typically be present in the composition in an amount up to 5 parts per hundred polymer (php) of the composition. U.V. absorbers, antioxidants, antistatic agents and stabilizers may also be present. Additionally, the cover compositions of the present invention may also include softening agents, such as plasticizers and processing aids and reinforcing materials, such as glass fibers and inorganic fillers, to add properties to the covers other than those affected by the principles of the present invention.

The blends are made and produced into a golf ball cover by processes known in the art of producing golf ball covers, processes such as extrusion molding or injection molding. It is within the skill of those in this field to produce a golf ball using the blend of the components according to the teachings of the present invention.

The present invention will be further described by way of the following examples, which are provided for illustration but are not to be considered as limiting.

TABLE I DISCUSSION

Various formulations are listed as Examples 1–18 in Tables I and II. Examples 16, 17, 18 are included to represent the results obtained using covers made from standard unblended ionomer materials used in prior art golf ball covers. The remaining examples include various blends of a high stiffness ionomer and a very low modulus ionomer. Examples 3, 6, 9, 12 and 15 are known examples of hard ionomer/soft ionomer blended materials. Examples 10, 11, 13, 14 illustrate properties of cover compositions utilizing below 50% high stiffness ionomer. Examples 7–9 show a 50/50 ratio of high stiffness ionomer to very low modulus ionomer.

Particular attention should be paid to the blends listed in Examples 1–9, utilizing high stiffness ionomer/VLMI blends at 80:20, 70:30 and 50:50 ratio.

TABLE I

| Ex # | BLEND | SIZE[a] | PGA[b] | WEIGHT[c] | SHORE D[d] | COR[e] | I.V.[f] |
|---|---|---|---|---|---|---|---|
| 1 | Surlyn 8240/ Surlyn 9320 @ 80/20 | 1.6838 | 101.1 | 45.47 | 66 | 0.726 | 253.2 |
| 2 | Surlyn AD8181/ Surlyn 9320 @ 80/20 | 1.6832 | 101.5 | 45.33 | 66 | 0.722 | 253.3 |
| 3 | Surlyn 8920/ Surlyn 9320 @ 80/20 | 1.6836 | 100.8 | 45.37 | 65 | 0.712 | 251.5 |
| 4 | Surlyn 8240/ Surlyn 9320 @ 70/30 | 1.6826 | 95.6 | 45.40 | 65 | 0.715 | 252.6 |
| 5 | Surlyn AD8181/ Surlyn 9320 @ 70/30 | 1.6829 | 96.4 | 45.29 | 65 | 0.716 | 253.0 |
| 6 | Surlyn 8920/ Surlyn 9320 @ 70/30 | 1.6842 | 96.8 | 45.47 | 64 | 0.706 | 251.4 |
| 7 | Surlyn 8240/ Surlyn 9320 @ 50/50 | 1.6827 | 92.1 | 45.43 | 61 | 0.707 | 251.2 |
| 8 | Surlyn AD8181 Surlyn 9320 @ 50/50 | 1.6837 | 91.5 | 45.44 | 61 | .705 | 251.2 |
| 9 | Surlyn 8920/ Surlyn 9320 @ 50/50 | 1.6846 | 92.4 | 45.28 | 61 | 0.700 | 250.4 |
| 10 | Surlyn 8240/ Surlyn 9320 @ 40/60 | 1.6823 | 88.9 | 45.40 | 58 | 0.698 | 250.7 |
| 11 | Surlyn AD8181/ Surlyn 9320 @ 40/60 | 1.6821 | 88.7 | 45.36 | 57 | 0.694 | 250.3 |
| 12 | Surlyn 8920/ Surlyn 9320 @ 40/60 | 1.6832 | 89.1 | 45.45 | 58 | 0.696 | 250.3 |
| 13 | Surlyn 8240/ Surlyn 9320 @ 20/80 | 1.6823 | 82.2 | 45.38 | 53 | 0.685 | 249.7 |
| 14 | Surlyn AD8181/ Surlyn 9320 @ 20/80 | 1.6817 | 83.0 | 45.38 | 54 | 0.685 | 249.6 |
| 15 | Surlyn 8920/ Surlyn 9320 @ 20/80 | 1.6818 | 83.2 | 45.26 | 54 | 0.686 | 249.2 |
| 16 | Surlyn 8240 @ | 1.6837 | 109.3 | 45.43 | 70 | 0.738 | 255.4 |

TABLE I-continued

| Ex # | BLEND | SIZE[a] | PGA[b] | WEIGHT[c] | SHORE D[d] | COR[e] | I.V.[f] |
|---|---|---|---|---|---|---|---|
| 17 | 100% Surlyn AD8181 @ 100% | 1.6849 | 110.4 | 45.49 | 69 | 0.738 | 255.6 |
| 18 | Surlyn 8920 @ 100% | 1.6844 | 106.6 | 45.44 | 67 | 0.721 | 252.9 |

3% color concentrate added to each blend.
[a]Size - diameter in inches
[b]PGA - deformation under fixed static load of 200 lbs.
[c]Weight - grams
[d]Shore D hardness, ASTM 2240
[e]Coefficient of Restitution(COR) - rebound velocity/forward velocity
[f]Initial Velocity(I.V.) - ft/sec Balls having covers of the compositions of Examples 1–18 above were tested for spin rate at various launch angles using a Driver, a No. 5 Iron and a pitching wedge. Spin rate was measured by observing the ball in flight using stop action strobe photography and the results are given below.

TABLE II

| | DRIVER | | 5-IRON | | PITCHING WEDGE | |
|---|---|---|---|---|---|---|
| Ex. # | L.A. | SPIN | L.A. | SPIN | L.A. | SPIN |
| 1 | 9.8 | 2623 | 20.8 | 6508 | 26.3 | 7003 |
| 2 | 9.6 | 2667 | 21.2 | 6381 | 25.4 | 6989 |
| 3 | 8.9 | 2711 | 20.6 | 6595 | 23.6 | 7164 |
| 4 | 9.8 | 2639 | 20.7 | 6520 | 24.2 | 8126 |
| 5 | 9.3 | 2628 | 20.5 | 6389 | 23.0 | 7697 |
| 6 | 9.6 | 2717 | 21.1 | 6489 | 23.5 | 8019 |
| 7 | 9.6 | 2870 | 20.7 | 6833 | 22.8 | 8384 |
| 8 | 9.3 | 2864 | 21.2 | 6714 | 22.8 | 8214 |
| 9 | 9.7 | 2617 | 21.1 | 6733 | 23.7 | 8309 |
| 10 | 9.3 | 2725 | 21.0 | 6867 | 22.8 | 8520 |
| 11 | 9.1 | 2730 | 20.5 | 6903 | 22.1 | 8551 |
| 12 | 19.7 | 2748 | 21.0 | 6917 | 22.3 | 8509 |
| 13 | 9.1 | 3136 | 20.3 | 7270 | 22.0 | 9117 |
| 14 | 9.0 | 3064 | 20.2 | 7272 | 21.8 | 9214 |
| 15 | 9.5 | 3123 | 20.5 | 7317 | 22.1 | 9176 |
| 16 | 9.7 | 2472 | 20.8 | 6347 | 25.2 | 6670 |
| 17 | 10.2 | 2342 | 20.7 | 6275 | 26.8 | 6053 |
| 18 | 9.6 | 2589 | 21.0 | 6233 | 24.0 | 7022 |

Driver club - Tour Ltd Metal Wood, 10.5° loft.
5-Iron club - Tour Ltd 5-Iron, 28° loft.
Pitching Wedge club - Tour Ltd Pitching Wedge, 50° loft.

TABLE III

| Ex. # | BLEND | COR | I.V. |
|---|---|---|---|
| 1 | Surlyn 8240/Surlyn 9320 @ 80/20 | +0.014 | +1.7 ft/sec |
| 2 | Surlyn AD8181/Surlyn 9320 @ 80/20 | +0.010 | +1.8 ft/sec |
| 3 | Surlyn 8920/Surlyn 9320 @ 80/20 | Base | Base |
| 4 | Surlyn 8240/Surlyn 9320 @70/30 | +0.009 | +1.2 ft/sec |
| 5 | Surlyn AD8181/Surlyn 9320 @ 70/30 | +0.010 | +1.6 ft/sec |
| 6 | Surlyn 8920/Surlyn 9320 @ 70/30 | Base | Base |
| 7 | Surlyn 8240/Surlyn 9320 @ 50/50 | +0.007 | +0.8 ft/sec |
| 8 | Surlyn AD8181/Surlyn 9320 @ 50/50 | +0.005 | +0.8 ft/sec |
| 9 | Surlyn 8920/Surlyn 9320 @ 50/50 | Base | Base |
| 10 | Surlyn 8240/Surlyn 9320 @ 40/60 | +0.002 | +0.4 ft/sec |
| 11 | Surlyn AD8181/Surlyn 9320 @ 40/60 | –0.002 | +0.0 ft/sec |
| 12 | Surlyn 8920/Surlyn 9320 @ 40/60 | Base | Base |
| 13 | Surlyn 8240/Surlyn 9320 @ 20/80 | –0.001 | +0.5 ft/sec |
| 14 | Surlyn AD8181/Surlyn 9320 @ 20/80 | –0.001 | +0.4 ft/sec |
| 15 | Surlyn 8920/Surlyn 9320 @ 20/80 | Base | Base |

Figure 2:
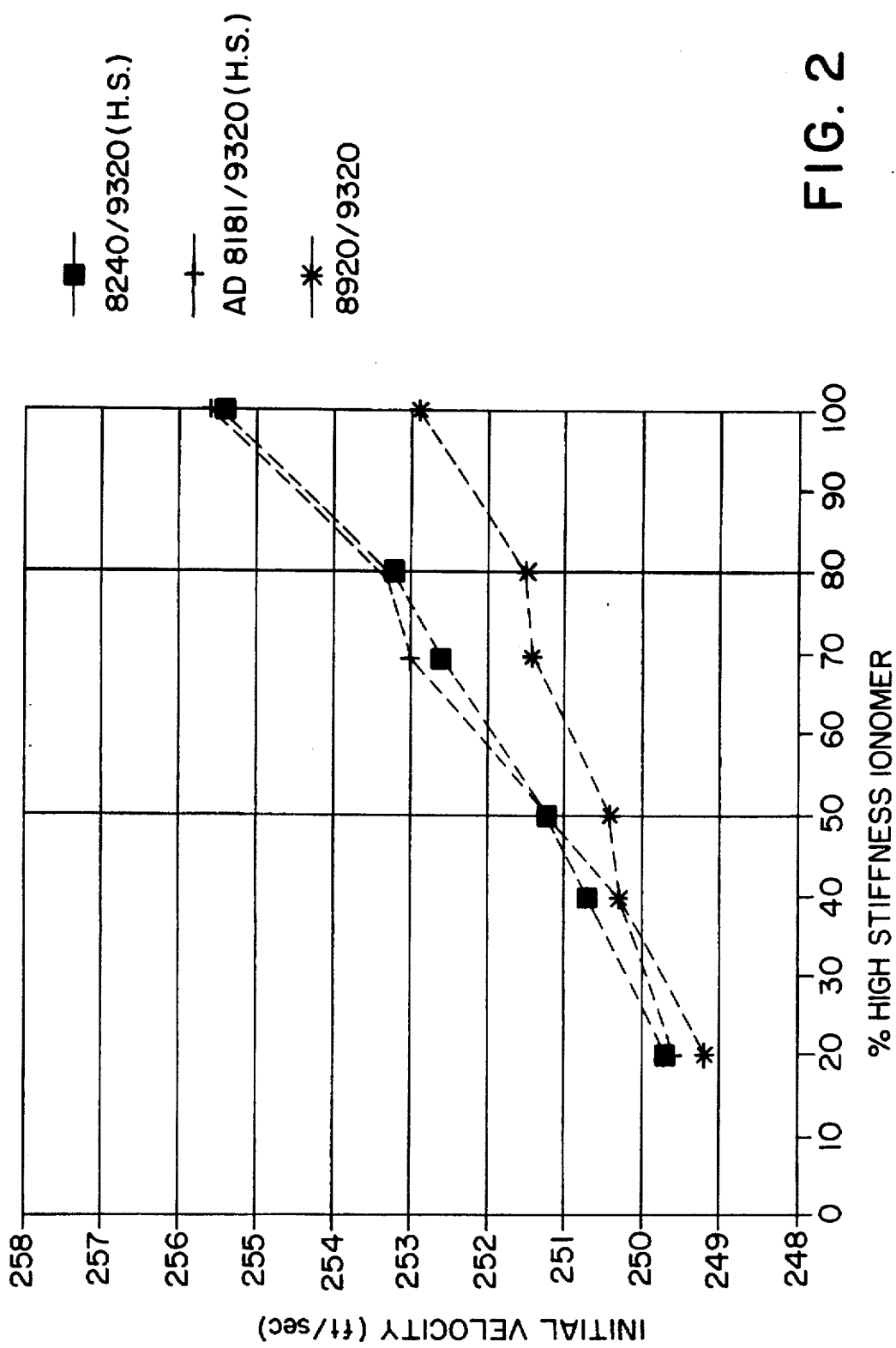
FIG. 2 illustrates the initial velocity versus the hard ionomer content for golf balls having covers with the blends of FIG. 1.

In Table III, blends for the golf ball cover of the present invention in its various ratios are compared to known blends (listed as Base) at the same ratio. Thus, Examples 1 and 2 are blends formulated according to the present invention in the ratio of 80:20 hard ionomer to very low modulus ionomer and Example 3 represents a known blend of hard and soft ionomers in the same ratio. It will be observed, from Table III and FIGS. 1 and 2, that blends of the cover material of the present invention containing 80, 70 and 50% high stiffness ionomer yield significantly improved COR and initial velocity compared to the values for a prior art blend of Surlyn 8920/Surlyn 9320 at the same ratio. Blends of the present invention including 50% high stiffness ionomer (Examples 7–9), 70% high stiffness (Examples 4–6) and 80% high stiffness ionomer (Examples 1–3), show an increase in COR over prior art blends of the same ratio. Blends utilizing 40% and 20% high stiffness ionomer show no improvement over the prior art blends (see Examples 10–15).

Table IV illustrates the PGA and spin of various blends produced according to the principles of the present invention. PGA measures deformation under a fixed static load of 200 lbs. The spin is measured using a Tour Limited Pitching Wedge with a 50° Loft. Results are given below.

TABLE IV

| EX. # | BLEND | PGA | PW SPIN |
|---|---|---|---|
| 1 | Surlyn 8240/Surlyn 9320 @ 80/20 | +0.3 | –161 |
| 2 | Surlyn AD8181/Surlyn | +0.7 | –175 |

TABLE IV-continued

| EX. # | BLEND | PGA | PW SPIN |
|---|---|---|---|
|  | 9320 @ 80/20 |  |  |
| 3 | Surlyn 8920/Surlyn 9320 @ 80/20 | Base | Base |
| 4 | Surlyn 8240/Surlyn 9320 @ 70/30 | −1.2 | +107 |
| 5 | Surlyn ADB181/Surlyn 9320 @ 70/30 | −0.4 | −322 |
| 6 | Surlyn 8920/Surlyn 9320 @ 70/30 | Base | Base |
| 7 | Surlyn 8240/Surlyn 9320 @ 50/50 | −0.3 | +75 |
| 8 | Surlyn AD8181/Surlyn 9320 @ 50/50 | −0.9 | −95 |
| 9 | Surlyn 8920/Surlyn 9320 @ 50/50 | Base | Base |
| 10 | Surlyn 8240/Surlyn 9320 @ 40/60 | −0.2 | +11 |
| 11 | Surlyn AD8181/Surlyn 9320 @ 40/60 | −0.4 | +42 |
| 12 | Surlyn 8920/Surlyn 9320 @ 40/60 | Base | Base |
| 13 | Surlyn 8240/Surlyn 9320 @ 20/80 | −1.0 | −59 |
| 14 | Surlyn AD8181/Surlyn 9320 @ 20/80 | −0.2 | +38 |
| 15 | Surlyn 8920/Surlyn 9320 @ 20/80 | Base | Base |

Figure 3:
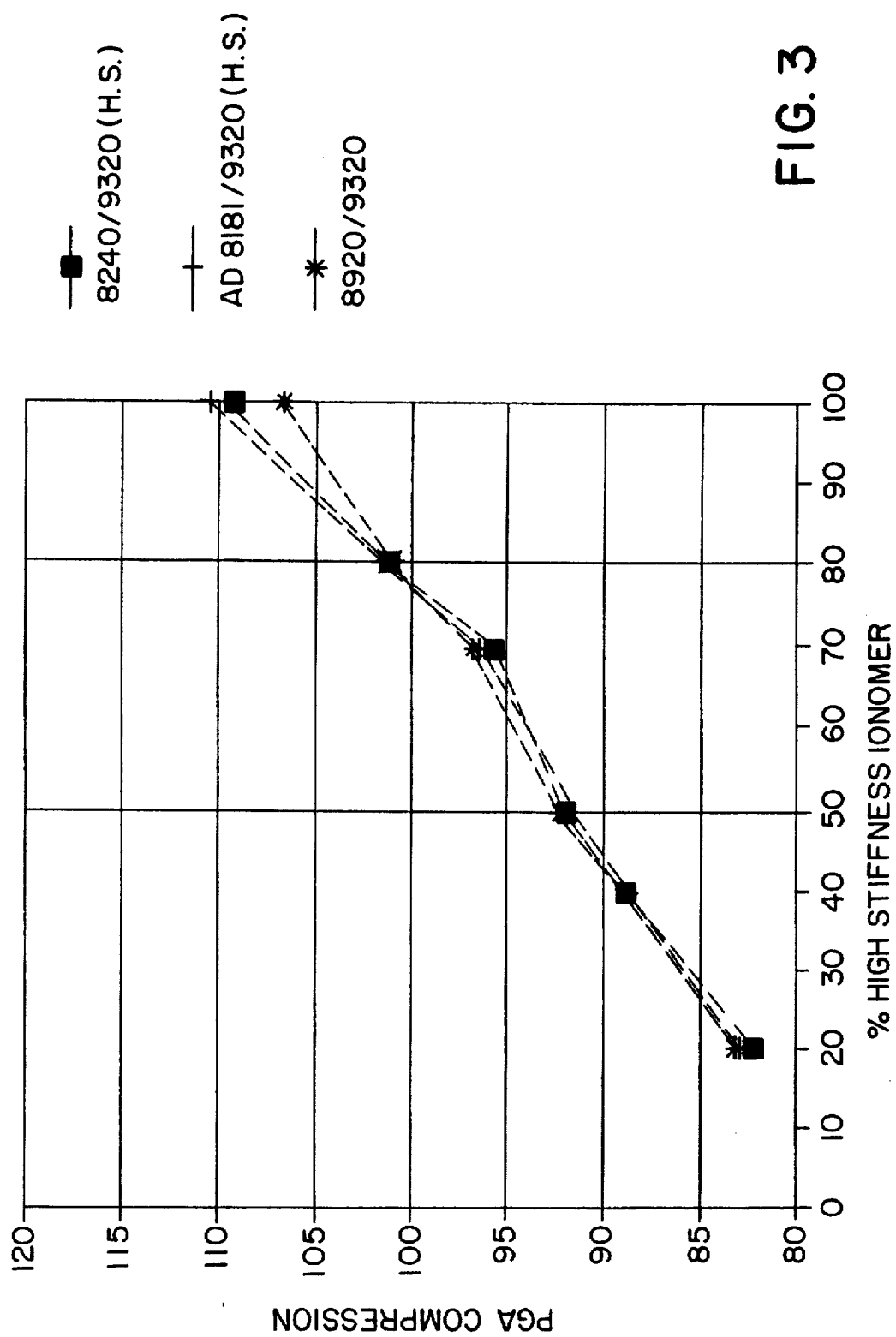
FIG. 3 compares the PGA Compression versus the hard ionomer content for golf balls having covers with the blends from FIGS. 1 and 2.
Figure 4:
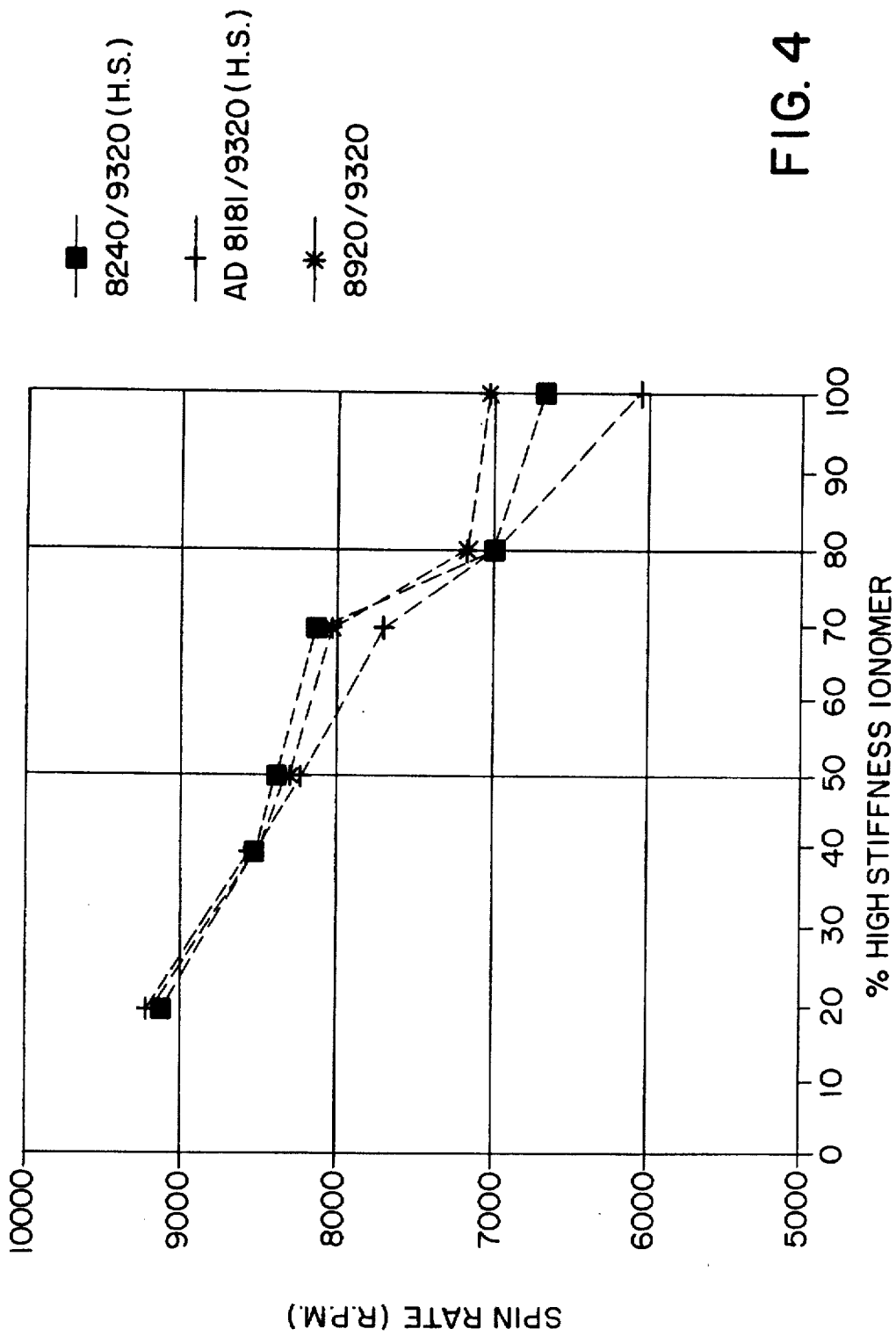
FIG. 4 compares the spin and the hard ionomer content for golf balls having covers with the same blends.

As can be seen in Table IV and FIGS. 3 and 4, blends containing high stiffness materials yield comparable PGA compression and spin rate off pitching wedge compared to prior art blends of hard and soft ionomers of the same ratio.

Examples 1 and 2 above include high stiffness ionomer/ VLMI blends at 80:20 ratio. The blends yield improved COR/initial velocity properties as compared to prior art Example 3. Surprisingly, playability characteristics (PGA compression, pitching wedge spin) are similar to those properties in the prior art blend. Thus by using high stiffness ionomers blended with VLMI, initial velocity/COR can be increased without sacrificing playability characteristics.

Examples 4 and 5 show the same improvements over prior art Example 6 as mentioned above, but at 70:30 ratio of highstiffness/VLMI.

Examples 7 and 8 show the same improvements over prior art Example 9 as mentioned above, but at 50:50 ratio of highstiffness/VLMI.

Examples 10, 11, 13 and 14 show no significant improvements vs. prior art blends 12, 15. This indicates that below 50% highstiffness ionomer, no benefits are observed.

It will be appreciated that the instant specification and claims are set forth by way of illustration and not of limitation and that various changes and modifications may be made without departing from the spirit and scope of the present invention.

What is claimed is:

1. A golf ball having a cover, wherein the cover comprises a blend of 80–40% by weight of a high stiffness ionomer and 20–60% by weight of a very low modulus ionomer, wherein said high stiffness ionomer is a copolymer of 75–80% of an olefin with 20–25% of an alpha, beta ethylenically unsaturated carboxylic acid having 10–90% of the carboxylic acid groups neutralized with sodium, lithium, zinc or magnesium ions and has a flexural modulus from about 75,000 to about 120,000 psi and a shore D hardness of 70 or greater and the very low modulus ionomer is a terpolymer of 67–70% by weight ethylene, 20–23% by weight n- or iso-butyl acrylate and 10% by weight methacrylic acid, where 10–90% of the acid groups are neutralized by sodium, zinc or lithium ions and has a flexural modulus from about 2,000 to 8,000 psi and a shore D hardness of 20–50.

2. The golf ball of claim 1 wherein the unsaturated carboxylic acid is selected from the group consisting of methacrylic acid, acrylic acid and mixtures of said acids.

3. The golf ball of claim 1 wherein the cover further comprises colorant in amounts up to 5 parts per hundred polymer.

4. A composition suitable for molding a golf ball cover comprising 80–40% by weight of a high stiffness ionomer and 20–60% by weight of a very low modulus ionomer, wherein said high stiffness ionomer is a copolymer of 75–80% of an olefin with 20–25% of an alpha, beta ethylenically unsaturated carboxylic acid having 10–90% of the carboxylic acid groups neutralized with sodium, lithium, zinc or magnesium ions and has a flexural modulus from about 75,000 to about 120,000 psi and a shore D hardness of 70 or greater and the very low modulus ionomer is a terpolymer of 67–70% by weight ethylene, 20–23% by weight n- or iso-butyl acrylate and 10% by weight methacrylic acid, where 10–90% of the acid groups are neutralized by sodium, zinc or lithium ions and has a flexural modulus from about 2,000 to 8,000 psi and a shore D harness of 20–50.

5. The composition of claim 4 wherein the unsaturated carboxylic acid is selected from the group consisting of methacrylic acid, acrylic acid and mixtures of said acids.

6. A method of making a golf ball comprising preparing a cover of a blend of 80–40% by weight of a high stiffness ionomer and 20–60% by weight of a very low modulus ionomer, wherein said high stiffness ionomer is a copolymer of 75–80% of an olefin with 20–25% of an alpha beta ethylenically unsaturated carboxylic acid having 10–90% of the carboxylic acid groups neutralized with sodium, lithium, zinc or magnesium ions and has a flexural modulus from about 75,000 to about 120,000 psi and a shore D hardness of 70 or greater and the very low modulus ionomer is a terpolymer of 67–70% by weight ethylene, 20–23% by weight n- or iso-butyl acrylate and 10% by weight methacrylic acid, where 10–90% of the acid groups are neutralized by sodium, zinc or lithium ions and has a flexural modulus from about 2,000 to 8,000 psi and a shore D hardness of 20–50.

7. The method of claim 6 wherein in the preparation of the cover the unsaturated carboxylic acid is selected from the group consisting of methacrylic acid, acrylic acid, and mixtures of said acids.

\* \* \* \* \*

UNITED STATES PATENT AND TRADEMARK OFFICE
CERTIFICATE OF CORRECTION

Patent No.: 5,538,794

Issued: July 23, 1996

Inventor(s): Cadorniga et al.

It is certified that error appears in the above-identified patent and that said Letters Patent is hereby corrected as shown below:

| | |
|---|---|
| Column 1, Line 63: | Delete "flexural modulus" and insert -- hardness -- therefor; |
| Column 3, Line 9: | Delete "highstiffness" and insert -- high-stiffness -- therefor; |
| Column 3, Line 9: | Before "Golf" insert a paragraph break; |
| Column 4, Line 13: | Delete "highstiffness" and insert -- high-stiffness -- therefor; |
| Column 7, Line 39: | In "Example #12", column title "Driver L.A." delete "19.7" and insert -- 9.7 -- therefor; |
| Column 9, Line 46: | Delete "highstiffness" and insert -- high-stiffness -- therefor; |
| Column 9, Line 49: | Delete "highstiffness" and insert -- high-stiffness -- therefor. |

Signed and Sealed this

First Day of May, 2001

*Attest:*

NICHOLAS P. GODICI

*Attesting Officer*   *Acting Director of the United States Patent and Trademark Office*